United States Patent [19]
Honda et al.

[11] Patent Number: 5,359,426
[45] Date of Patent: Oct. 25, 1994

[54] REPRODUCING A BANDWIDTH EXPANDED CHROMA SIGNAL WITH REDUCED NOISE AND REDUCED FLICKER

[75] Inventors: Takashi Honda; Dai Sato, both of Kanagawa, Japan

[73] Assignee: Sony Corporation, Tokyo, Japan

[21] Appl. No.: 986,706

[22] Filed: Dec. 8, 1992

[30] Foreign Application Priority Data

Dec. 16, 1991 [JP] Japan .................. 3-332118

[51] Int. Cl.$^5$ .............................. H04N 9/83
[52] U.S. Cl. .................. 358/310; 358/316; 358/326; 348/609
[58] Field of Search .......... 358/310, 315, 316, 328, 358/320, 340, 133, 326; 348/609, 505; H04N 9/83

[56] References Cited

U.S. PATENT DOCUMENTS

| | | | |
|---|---|---|---|
| 4,524,380 | 6/1985 | Shibata et al. | 358/316 |
| 4,612,585 | 9/1986 | Takase et al. | 358/316 |
| 4,668,988 | 5/1987 | Sasaki et al. | 358/315 |
| 4,692,801 | 9/1987 | Ninomiya et al. | 358/133 |
| 4,772,961 | 9/1988 | Ichinoi | 360/9.1 |
| 5,043,798 | 8/1991 | Emori | 358/12 |
| 5,161,032 | 11/1992 | Kobayashi et al. | 358/326 |

FOREIGN PATENT DOCUMENTS

0286157 10/1988 European Pat. Off. .

OTHER PUBLICATIONS

IEICE Transactions vo. E-72, No. 4, 30 Apr. 1989, Tokyo JP pp. 324–325, XP000046974 M. Kobayashi et al. 'Chrominance Bandwidth Expansion of Color-under VCR'.

Primary Examiner—Tommy P. Chin
Assistant Examiner—Huy Nguyen
Attorney, Agent, or Firm—William S. Frommer; Alvin Sinderbrand

[57] ABSTRACT

A chroma signal is emphasized then sub-sampled using a sampling offset differing by 90° in four consecutive fields, then recorded on a recording medium. After reproduction from the recording medium, the phase of the reproduced chroma signal is corrected, and the phase corrected reproduced chroma signal is interpolated to increase its bandwidth and then non-linearly de-emphasized to reduce the noise contained therein. The interpolation is performed on adjacent pixels of four consecutive fields of the phase corrected reproduced chroma signal, and occurs before non-linear de-emphasis to reduce flicker.

4 Claims, 13 Drawing Sheets

1st Field

2nd Field

3rd Field

4th Field

| 1 | | 3 | | 1 | | 3 | | 1 | |
| | 2 | | 4 | | 2 | | 4 | | 2 |
| 3 | | 1 | | 3 | | 1 | | 3 | |
| | 4 | | 2 | | 4 | | 2 | | 4 |
| 1 | | 3 | | 1 | | 3 | | 1 | |
| | 2 | | 4 | | 2 | | 4 | | 2 |
| 3 | | 1 | | 3 | | 1 | | 3 | |
| | 4 | | 2 | | 4 | | 2 | | 4 |
| 1 | | 3 | | 1 | | 3 | | 1 | |

REPRODUCING A BANDWIDTH EXPANDED CHROMA SIGNAL WITH REDUCED NOISE AND REDUCED FLICKER

BACKGROUND OF THE INVENTION

1. Field of the Invention

The present invention relates to video signal recording apparatus for use with a video tape recorder (VTR) and, more particularly, to a video signal recording apparatus for down-converting and recording a chroma component.

2. Description of the Prior Art

In home VTRs, a chroma component included in a video signal is down-converted and the chroma signal thus down-converted is recorded together with a frequency-modulated (FM) luminance signal. In this case, the chroma signal is down-converted into a chroma signal having a frequency of 700 kHz, for example and a band width of this down-converted chroma signal lies in a range of from about ±400 to 500 kHz. The down-converted chroma signal having a relatively narrow band is recorded on a video tape together with the frequency-modulated luminance signal, whereby the video signal can be efficiently recorded on the video tape and a video system suitable for home use in which a tape consumed amount is limited can be constructed.

However, when the chroma signal is down-converted and then recorded on the video tape, there is then the disadvantage that the chroma component of the reproduced signal is deteriorated. That is, since the chroma signal is recorded such that the band width thereof is reduced by the above down-converting processing, it is difficult to restore the band width of the original chroma signal. Therefore, as compared with the luminance signal recorded according to the frequency modulation, the chroma signal is very poor from a characteristics standpoint.

In the real reproduced picture, the characteristic of the luminance signal is dominant apparently and the frequency characteristics of the luminance signal has been improved (high band) recently in order to improve the picture quality. In order to improve the picture quality more, it is requested to improve the characteristics of the chroma signal (i.e., improvement of color reproducibility).

To improve the chroma signal characteristic, it is proposed to shift a down-converting carrier of about 700 kHz to a slightly higher frequency by shifting the converting frequency to the high frequency side. If the down-converting carrier is varied as described above, however, a compatibility with the conventional VTRs is lost. Furthermore, if the down-converting carrier is set to a too high frequency, the frequency band of the down-converted chroma signal overlaps the recording band of the luminance signal recorded according to the frequency modulation. Therefore, the sufficiently high carrier cannot be set in actual practice so that a wholesale improvement of characteristics cannot be expected without regard for the problem of compatibility.

As a method in which characteristics can be improved only by the circuits on the playback side without changing the down-converted carrier, there is known a method which emphasizes the edge of the reproduced chroma signal. According to the edge improvement mentioned above, the characteristics are partly improved and a recording band cannot be enlarged fundamentally. Also, there is the disadvantage that a S/N (signal-to-noise) ratio is deteriorated.

FIG. 1 of the accompanying drawings shows an example of a conventional VTR 1.

As shown in FIG. 1, a video signal SV is supplied to an AGC (automatic gain control) circuit 2, in which it is corrected in signal level. The signal thus corrected from the AGC circuit 2 is supplied to a Y/C separating circuit 3, in which it is separated to provide a luminance signal Y and a chroma signal C.

Further, in the VTR 1, while the luminance signal Y is frequency-modulated to a recording signal YFM by a luminance signal processing circuit 4, the chroma signal C is supplied through a bandpass filter (BPF) circuit 5 to an ACC (automatic chroma level control) circuit 6, in which it is corrected in signal level and then fed to an emphasizing circuit 7.

Thus, in the VTR 1, the chroma signal is emphasized by the emphasizing circuit 7 and then down-converted by a converting circuit 8.

Further, in the VTR 1, the down-converted chroma signal is supplied through a low-pass filter (LPF) circuit 9 to an adding circuit 10, in which it is added with a tracking control pilot signal ATF and the recording signal YFM.

Further, in the VTR 1, an output signal from the adding circuit 10 is supplied through an amplifying circuit 11 to a magnetic head 12, whereby recording tracks are sequentially formed on a magnetic tape 13, thereby recording a video signal on the above recording tracks.

Whereas, in the reproducing system, an output signal from the magnetic head 12 is amplified by an amplifying circuit 14 and then a luminance signal is demodulated by a luminance signal processing circuit 15.

In the VTR 1, a chroma signal component is extracted from the output signal of the amplifying circuit 14 by a low-pass filter (LPF) circuit 16 and then corrected in phase characteristic. Then, this chroma signal component is corrected in signal level by an ACC circuit 17.

Further, in the VTR 1, the output signal from the ACC circuit 17 is supplied to a converting circuit 18, in which it is converted into a signal of the original frequency band. Then, this signal is sequentially supplied through a band-pass filter (BPF) circuit 19 and a comb filter circuit 20 to a de-emphasizing circuit 21.

In the VTR 1, the chroma signal is de-emphasized and then added with the luminance signal by an adder circuit 22, whereby the video signal SV is output through the adder circuit 22.

In this kind of VTR, the picture quality is improved by enlarging the frequency band of the luminance signal. Therefore, it is considered that, if the frequency band of the chroma signal is enlarged, then the picture quality can be improved more.

In this case, in the luminance signal recorded on the magnetic tape at its high band side, the frequency band can be enlarged comparatively easily while maintaining a compatibility with the conventional format. Whereas, the chroma signal is recorded on the magnetic tape at its low band side and the frequency band thereof is limited so that the frequency band cannot be substantially enlarged while maintaining the compatibility with the conventional format.

OBJECTS AND SUMMARY OF THE INVENTION

Therefore, it is an object of the present invention to provide a recording apparatus which can improve a frequency band of a chroma signal under condition that a compatibility with a conventional recording apparatus can be maintained.

Another object of the present invention is to provide a reproducing apparatus which can satisfactorily improve a frequency band of a chroma signal under the condition that a compatibility with a conventional video signal recording apparatus can be maintained.

A further object of the present invention is to provide a magnetic reproducing apparatus which can improve a picture quality of a reproduced picture satisfactorily as compared with a conventional magnetic reproducing apparatus.

According to a first aspect of the present invention, there is provided a video signal recording apparatus in which a chroma signal contained in a video signal is down-converted and then recorded on a predetermined recording medium. This video signal recording apparatus comprises a sampling circuit for processing the chroma signal in an offset sub-sampling fashion, wherein the chroma signal sampled by the sampling circuit is recorded on the recording medium and a burst signal for detecting a phase of the chroma signal is not sub-sampled and then recorded on the recording medium.

According to a second aspect of the present invention, there is provided a video signal recording apparatus in which a chroma signal contained in a video signal is down-converted and then recorded on a predetermined recording medium. This video signal recording apparatus comprises a decoder circuit for decoding the down-converted chroma signal contained in the video signal reproduced from the recording medium so that the down-converted chroma signal has an original band, an interpolating circuit for interpolating an offset amount of the chroma signal, a first crosstalk cancel circuit for canceling a crosstalk component of the interpolated chroma signal, and a second crosstalk cancel circuit for canceling a crosstalk component from an output of a decoder, wherein the chroma signal is phase-adjusted within the decoder by phase-comparing an output signal of the second crosstalk cancel circuit with a reference signal.

In accordance with a third aspect of the present invention, there is provided a magnetic recording and reproducing apparatus for reproducing a chroma signal and a luminance signal from a predetermined magnetic recording medium in which the chroma signal is processed in a non-linear emphasizing processing fashion, compressed in band, down-converted and then recorded together with the luminance signal. This magnetic recording and reproducing apparatus comprises a magnetic head for outputting a reproduced signal from the recording medium, an interpolating circuit for extracting the chroma signal from the reproduced signal and interpolating the chroma signal so that a band of the chroma signal is expanded, a non-linear de-emphasizing circuit for processing an output signal of the interpolating circuit in a non-linear de-emphasizing processing fashion to demodulate the chroma signal, and a de-emphasizing circuit for suppressing a side band of a burst signal of a chroma signal contained in the reproduced signal, wherein an automatic phase control (APC) loop is formed on the basis of the burst signal output from the de-emphasizing circuit and whose side band is suppressed.

The above and other objects, features, and advantages of the present invention will become apparent from the following detailed description of illustrative embodiments thereof to be read in conjunction with the accompanying drawings, in which like reference numerals are used to identify the same or similar elements and parts in the several views.

DETAILED DESCRIPTION OF THE PREFERRED EMBODIMENTS

The present invention will now be described in detail with reference to the drawings.

Figure 2:
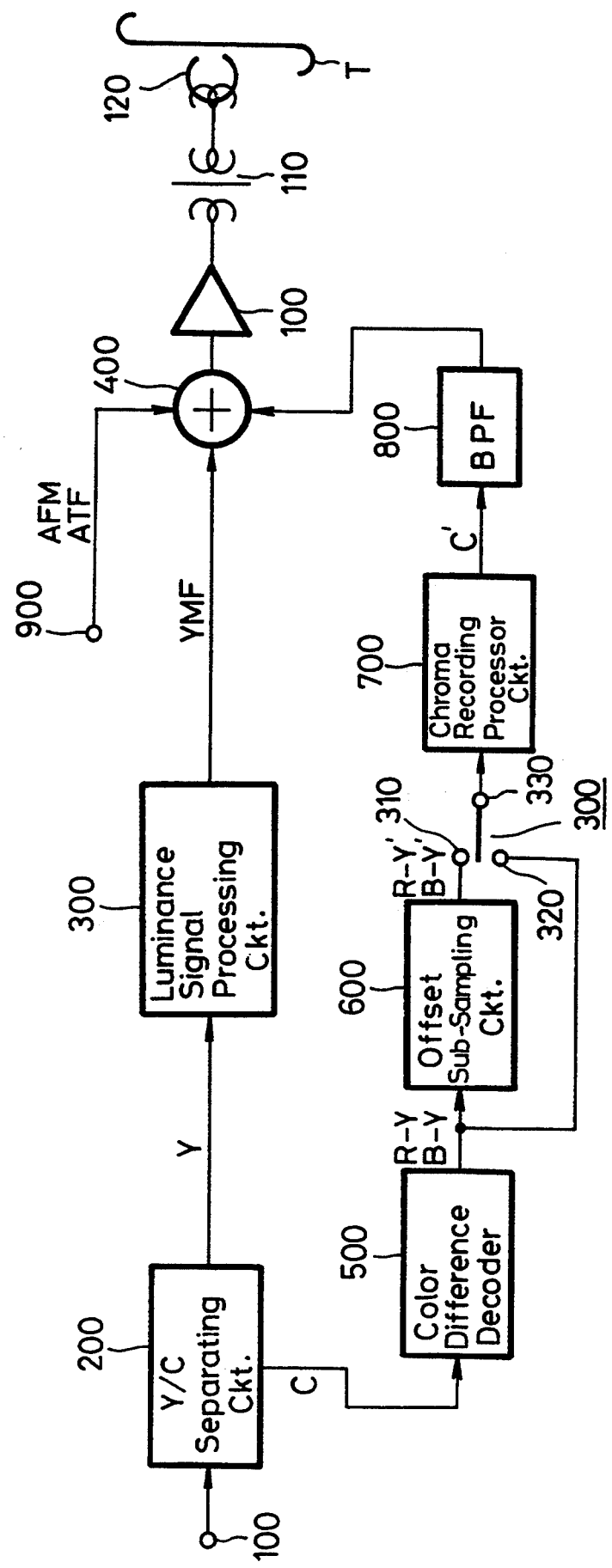
FIG. 2 is a block diagram showing a recording system of an embodiment of the present invention.

In the first embodiment, the present invention is applied to a video tape recorder (VTR) whose format conforms to a so-called 8-mm video tape recorder. FIG. 2 of the accompanying drawings shows in block form a circuit arrangement of a recording system thereof and FIG. 3 of the accompanying drawings shows in block form a circuit arrangement of a reproducing system thereof.

Referring to FIG. 2, the recording system will be described first. As shown in FIG. 2, a composite video signal to be recorded is applied to an input terminal 100. The composite video signal applied to the input terminal 100 is supplied to a luminance/chroma signal separating circuit 200, in which it is separated to provide a luminance signal Y and a chroma signal C. The resultant luminance signal Y is supplied to a luminance signal processing circuit 300, in which it is processed according to some suitable recording signal processing such as a frequency modulation or the like, and a frequency-modulated luminance signal YFM is supplied to a mixer 400.

The resultant chroma signal C from the luminance/chroma signal separating circuit 200 is supplied to a color difference decoder 500 which derives red and blue color difference signals R-Y and B-Y. Also, a burst signal having the same color subcarrier frequency $f_{sc}$ as that of the chroma signal C and which is superimposed upon the horizontal blanking period of the video signal is supplied from the luminance/chroma separating circuit 200 to the color difference decoder 500, thereby being processed.

The color difference signals R-Y and B-Y from the color difference decoder 500 are supplied to an offset sub-sampling circuit 600, in which they are processed according to a predetermined offset sub-sampling fashion. This offset sub-sampling processing will be described later on. Color difference signals R-Y' and B-Y' thus processed in an offset sub-sampling fashion are supplied to a first fixed contact 310 of a change-over switch 300. The color difference signals R-Y and B-Y output from the color difference decoder 500 are directly supplied to a second fixed contact 320 of the change-over switch 300.

A movable contact 330 of the change-over switch 300 is changed over in response to the conditions of the video signals supplied thereto. During the horizontal blanking period in which a burst signal (color synchronizing signal) added to the starting portion of each field period) is obtained, the movable contact 330 of the change-over switch 300 is connected to the second fixed contact 320. The movable contact 330 is connected to the first fixed contact 310 during other periods. Then, color difference signals developed at the movable contact 330 of the change-over switch 300 are supplied to a chroma recording processing circuit 700.

The chroma recording processing circuit 700 processes the thus sub-sampled color difference signals R-Y' and B-Y' for recording. More specifically, the sub-sampled color difference signals R-Y' and B-Y' are encoded to provide a chroma signal and the chroma signal thus encoded is down-converted to provide a chroma signal C'. In this embodiment, a frequency of 743 kHz is employed as a down-converting carrier. The chroma signal C' thus down-converted is supplied through a bandpass filter 800 to the mixer 400. A center pass band frequency of the bandpass filter 800 is selected to be 743 kHz and an aliasing noise contained in the chroma signal C' is canceled by the bandpass filter 800. The burst signal supplied to the chroma recording processing circuit 700 is similarly down-converted and then supplied to the mixer 400.

A frequency-modulated audio signal AFM and a tracking pilot signal ATF developed at a terminal 900 are supplied to the mixer 400.

The luminance signal YFM, the chroma signal C', the audio signal AFM and the tracking pilot signal ATF supplied are mixed by the mixer 400 in a frequency-multiplexed fashion. A mixed signal is supplied through a recording amplifier 100 and a rotary transformer 110 to a rotary head apparatus 120, thereby being recorded on a video tape T in a predetermined format.

The offset sub-sampling operation done by the offset sub-sampling circuit 600 will be described. In this embodiment, the sub-sampling shown in FIGS. 4A through 4D is carried out. According to this embodiment, a sampling clock is selected to be $f_{sc}/4$ ($f_{sc}$ is a color subcarrier of the video signal, i.e., 3.58 Mhz) and the sampling in which the signal is offset by 90° between the field, i.e., one cycle is formed of 4 fields is carried out. $f_{sc}$ is equal to [3.58 MHz ÷ 4] and therefore corresponds to about 895 kHz.

Figure 4A:
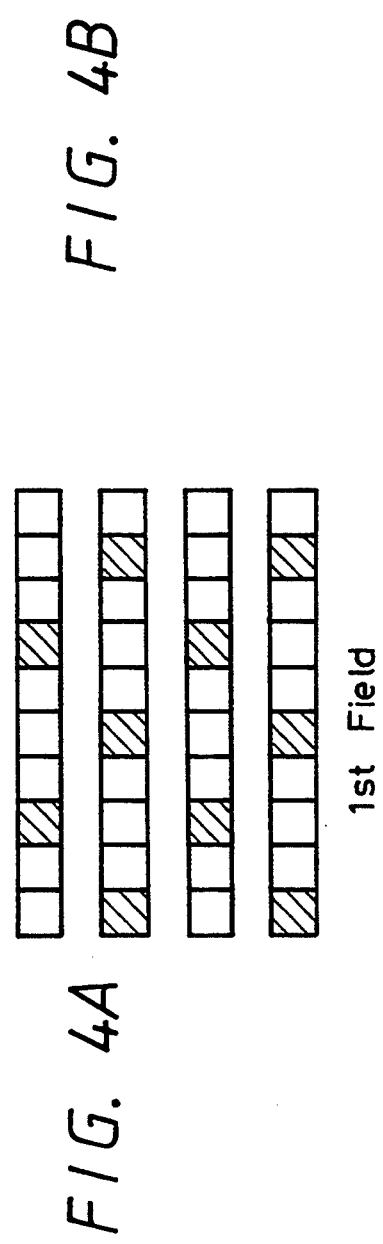
FIGS. 4A through 4D are explanatory diagrams showing the sub-sampling states according to the embodiment of the present invention.

In the sub-sampling process, sampling points shown hatched in FIGS. 4A through 4D are sampled at every field. In this case, since the interlace scanning is carried out, a spatial position of line is different in odd-field and even-field. During the first field, a sub-sampling processing in which one sampling is carried out at every four sample of each line is carried out as shown in FIG. 4A. Then, in the following sampling processing, as the offset amount, the offset of 90° is carried out at every field, the offset of 180° is carried out at every frame and the offset of 180° is carried out at every line.

Figure 4B:
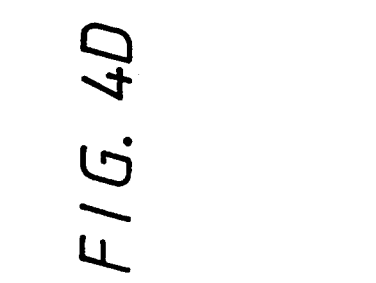
Figure 4C:
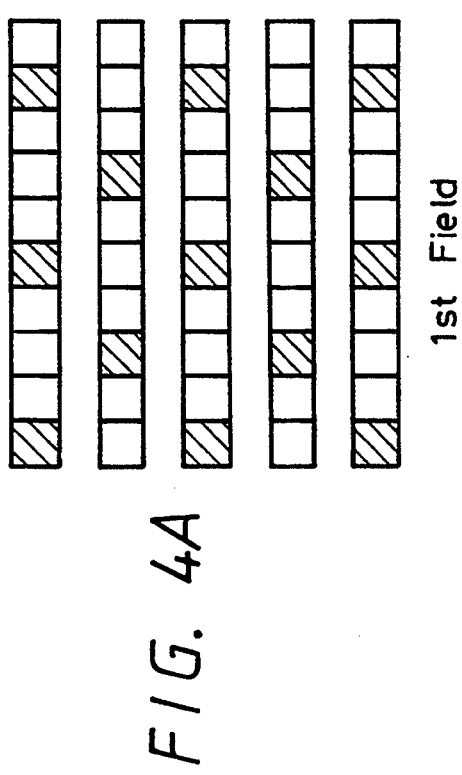
Figure 4D:
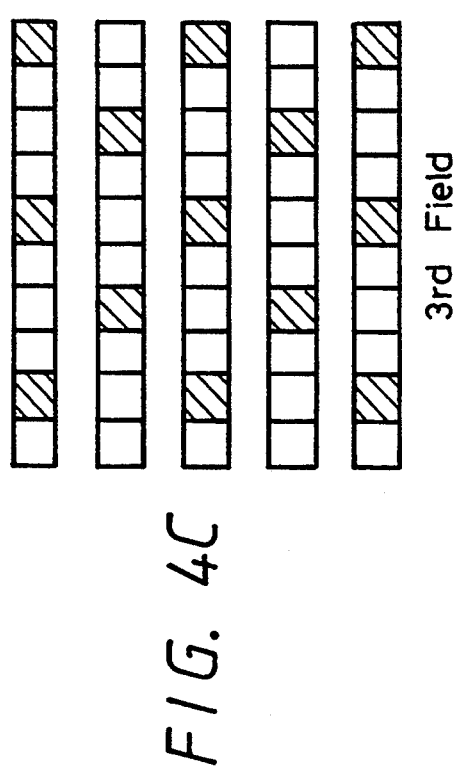

More specifically, during the next field (second field), as shown in FIG. 4B, the sampling where the phase is offset by 90° is carried out at every four samples. Further, during the third field (FIG. 4C) and the fourth field (FIG. 4D), the sampling in which the phase is offset by 90° is carried out. During the next fifth field, the sampling in which the phase is the same as that of the first field is carried out. Then, the sampling state of four fields will be repeated.

According to this embodiment, the chroma signal whose horizontal lines are thrown away and selected according to the sampling process is recorded on the video tape. The burst signal that is a reference signal of the chroma signal is not processed by the offset sub-sampling process and recorded.

A circuit arrangement of a reproducing system for reproducing the thus recorded video signal will be described with reference to FIG. 3 of the accompanying drawings.

Figure 3:
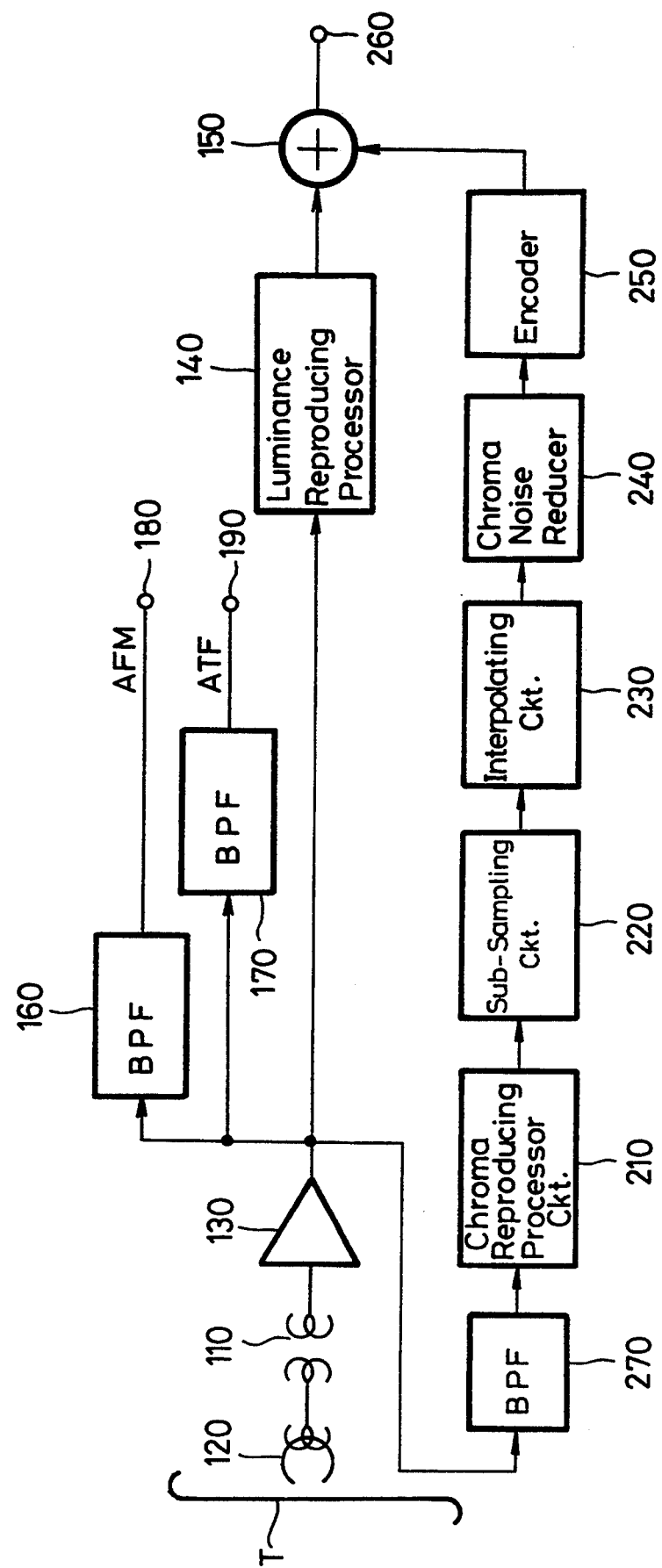
FIG. 3 is a block diagram showing a reproducing system of the embodiment of the present invention.

As shown in FIG. 3, a signal reproduced from the video tape T by the rotary head apparatus 120 is supplied through the rotary transformer 110 and a playback amplifier 130 to a luminance reproducing processor circuit 140. A frequency-modulated luminance signal YFM contained in the reproduced signal is detected by the luminance reproducing processor circuit 140 and this luminance signal is demodulated. The luminance signal Y thus demodulated is supplied to a mixer 150.

A reproduced signal from the playback amplifier 130 is supplied to bandpass filters 160 and 170. The bandpass filters 160, 170 have pass bands corresponding to recording bands of the frequency-modulated audio signal AFM and the tracking pilot signal ATF. Therefore, the frequency-modulated audio signal AFM and the tracking pilot signal ATF are developed at terminals 180 and 190, respectively.

In accordance with this embodiment, the reproduced signal from the playback amplifier 130 is supplied to a bandpass filter 270. A pass band center frequency of the bandpass filter 270 is selected to be 743 kHz to extract the down-converted recorded chroma signal C' (including the burst signal). An output of the bandpass filter 270 is supplied to a chroma reproducing processor circuit 210, in which it is converted into baseband color difference signals R-Y', B-Y'. In this reproducing processing, the processing is carried out while the phase of the burst signal obtained by the reproduction is employed as a reference phase. The color difference signals R-Y', B-Y' thus converted are supplied to a sub-sampling circuit 220, in which they are sampled with a sampling frequency of $f_{sc}/4$. This sampling frequency $f_{sc}/4$ corresponds, for example, to about 895 kHz as described above The sampled color difference signals are supplied to an interpolating circuit 230, in which it is interpolated in offset amount to provide a color difference signal of a transmission band of $f_{sc}/2$. This interpolating circuit 230 might be formed of a frame memory where the interpolation is carried out by utilizing color difference signals of immediately preceding (or ahead of or behind) 4 fields. A color difference signal thus interpolated is supplied to a chroma noise reducer (CNR) 240, in which it is eliminated in noise. Then, the color difference signal from which the noise is eliminated is supplied to an encoder 250, in which it is encoded to provide a chroma signal modulated by a color subcarrier of 3.58 MHz.

The chroma signa thus processed in a playback processing manner is supplied to the mixer 150, in which it is added with the luminance signal to provide a composite video signal. This composite video signal is supplied to a reproduced signal output terminal 260.

Figures 5, 6:
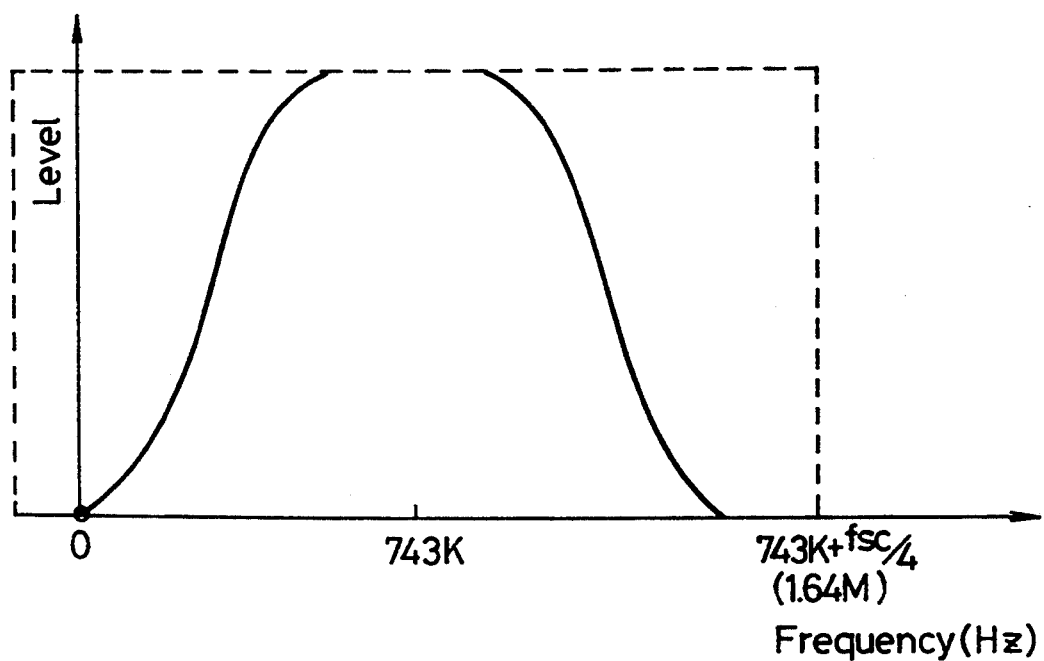
FIG. 5 is an explanatory diagram showing an interpolated state according to the embodiment of the present invention.
FIG. 6 is a characteristic graph of a sampling frequency versus level and to which references will be made in explaining operation of the embodiment of the present invention.

The processing state of the chroma signal in the reproducing system will be described. FIG. 5 of the accompanying drawings shows an interpolation state in the interpolating circuit 230. In FIG. 5, numerals indicated on respective pixel positions represent field numbers from the first to fourth fields (see FIGS. 4A to 4D) in which the sampling is carried out cyclically. A reproduced chroma signal is obtained by interpolating the offset amounts by using the chroma signals of the four fields.

Figure 7:
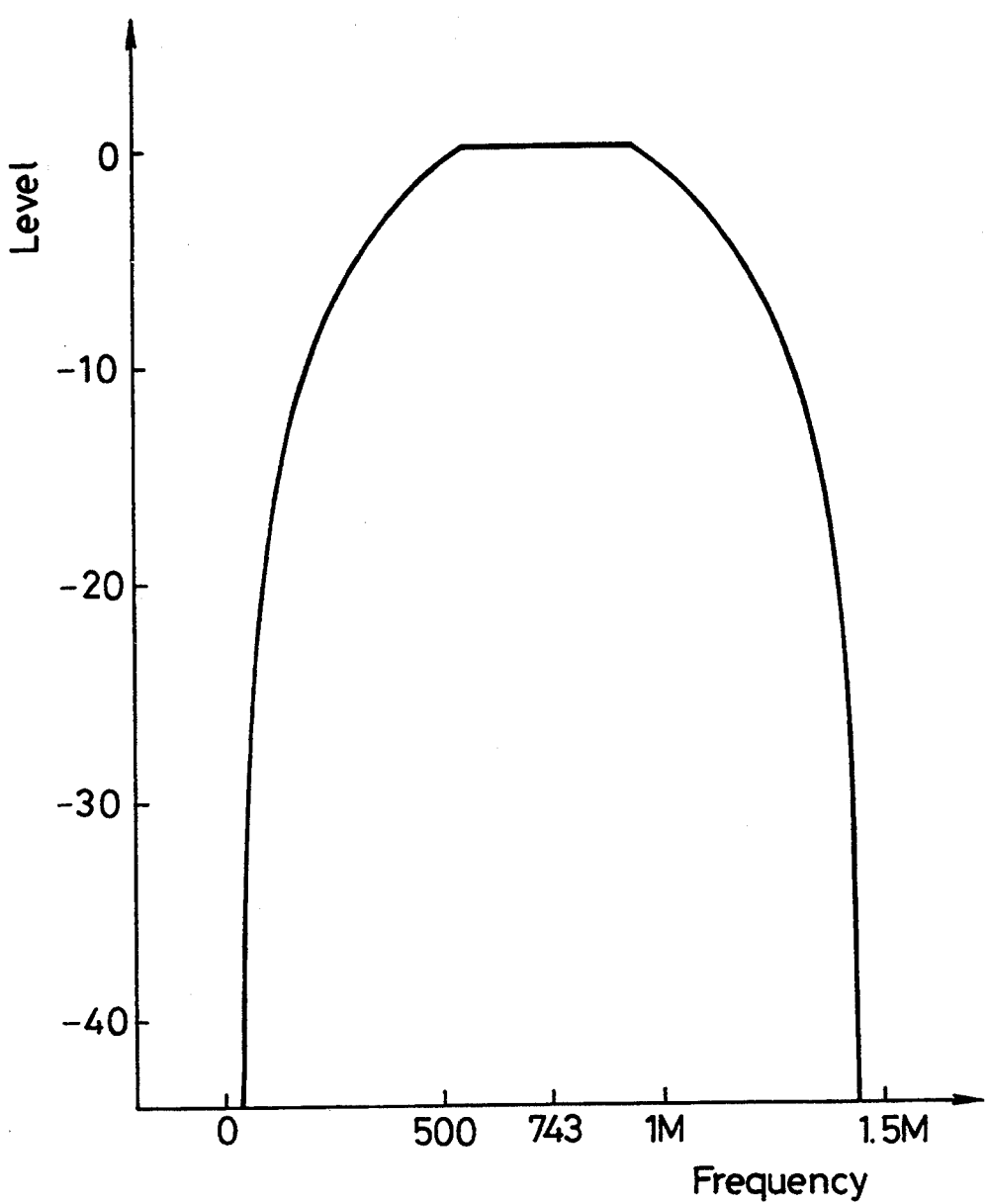
FIG. 7 is a characteristic graph of a symmetrical roll-off characteristic and to which references will be made in explaining operation of the embodiment of the present invention.

A transmission rate of the thus obtained reproduced chroma signal becomes $f_{sc}/2$ and the band of the reproduced chroma signal becomes $f_{sc} \pm (f_{sc}/4)$. FIG. 6 of the accompanying drawings shows this frequency band. Since the color subcarrier frequency $f_{sc}$ is 743 kHz, the conventional system where the sub-sampling is not effected presents a band that is centered on 743 kHz and determined by the chroma extracting filter characteristic as shown by a solid line. According to this embodiment, the band up to 1.64 MHz that corresponds to $f_{sc}+(f_{sc}/4)$ shown by a broken line is enlarged in flat. A flat band up to the sub-sampling clock is realized if a transmission frequency characteristic until the chroma signal is interpolated upon reproduction after it was sub-sampled and then recorded on the tape is presented as a symmetrical cosine roll-off characteristic. FIG. 7 of the accompanying drawings shows a graph of a symmetrical roll-off transmission characteristic where $-\infty$ is presented as 700 kHz.

When the chroma signal is processed as described above, as compared with the conventional case that the chroma signal of band ranging of about from ±400 to 500 kHz is reproduced, the band of the chroma signal is widened twice or more, thereby considerably improving the frequency characteristic of the chroma signal. Therefore, a picture based on the reproduced video signal developed at the output terminal 260 becomes excellent in color reproducibility. In this case, since the recording format such as a carrier, a band width of a signal recorded on the video tape and so on is the same as that of the conventional system (8-mm video system in this embodiment), the video tape on which the recording is effected by the conventional VTR can be reproduced with ease, thereby maintaining a compatibility with the conventional one. Also, characteristics of the elements and parts such as a video tape, a recording and reproducing head or the like need not be improved. From this standpoint, a compatibility with the conventional VTR can be maintained. Further, the frequency characteristic of the chroma signal is improved fundamentally and is not improved partly, thereby preventing a signal-to-noise (S/N) ratio from being deteriorated.

According to this embodiment, since the burst signal that becomes a reference signal of the chroma signal is not sub-sampled and then recorded, the processing such as phase-detection of the burst signal in the reproducing system circuit or the like can be carried out by the circuits of the same arrangements as those in the circuits in the conventional VTR, thereby simplifying the arrangement of the reproducing system. Further, if the burst signal is not sub-sampled and then recorded as described in this embodiment, then the burst signal can be prevented from being offset and the occurrence of flicker or the like due to the phase shift based on the offset can be avoided.

While the sub-sampling is carried out at the offset of 90° between the fields as described above, the sub-sampling can be carried out under other offset condition. While the chroma signal is converted into the color difference signals and then processed as described above, the chroma signal may be processed without being converted into the color difference signals. In this case, if the chroma signal is converted into the color difference signals and then processed, then the arrangement of the processing circuit can be simplified.

According to the first embodiment of the present invention, since the chroma signal is recorded by the offset sub-sampling process and then restored by the interpolation processing upon playback, the chroma signal of the band several times as wide can be recorded and then reproduced by using the same recording band as that of the prior art. Also, since the burst signal of the chroma signal is not sub-sampled and then recorded, the recording state of the burst signal becomes the same as that in the prior art, thereby maintaining the compatibility with the conventional system.

Figure 8:
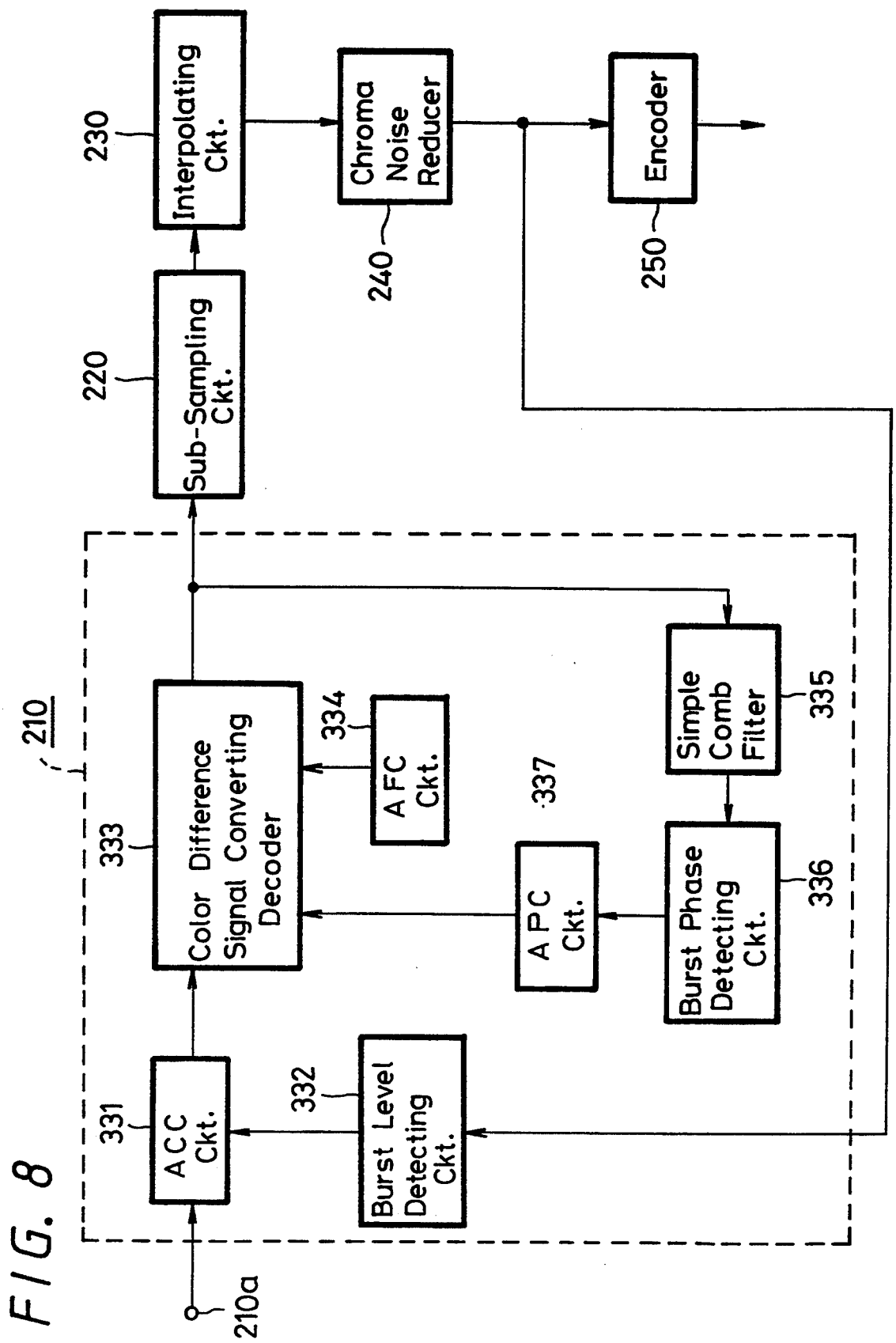
FIG. 8 is a block diagram showing a circuit arrangement of a main portion of a reproducing system according to a second embodiment of the present invention.

A second embodiment of the present invention will be described below. FIG. 8 of the accompanying drawings shows an arrangement of another example of the chroma reproducing processor circuit 210.

As shown in FIG. 8, the output applied to a terminal 210a from the bandpass filter 270 (FIG. 3) is supplied to an automatic chroma level control (ACC) circuit 331. Then, the ACC circuit 331 controls the level of the chroma signal so as to become constant on the basis of the level data of the burst signal supplied thereto from a burst level detecting circuit 332. In this case, the burst level detecting circuit 332 detects the level data from the burst signal contained in the output of the earlier-noted chroma noise reducer 240.

An output of the ACC circuit 331 in which the level of the chroma signal is made constant is supplied to a color difference decoder 333. The color difference decoder 333 is adapted to convert the recording down-converted chroma signal into color difference signals. Therefore, when the frequency signal supplied from an automatic frequency control circuit 334 is mixed into the chroma signal in the color difference decoder 333, the down-converted chroma signal is converted into the color difference signals R-Y' B-Y'.

Then, during the conversion in the color difference decoder 333, a jitter eliminating processing utilizing an automatic phase control (APC) circuit 337 is effected. More specifically, an output of the color difference converting decoder 333 is supplied to a simple comb filter 335. Then, color difference signals from which the crosstalk component is simply eliminated by this simple comb filter 335 is supplied to a burst phase detecting circuit 336. A burst signal component contained in the color difference signals is detected by this burst phase detecting circuit 336 and phase data of this burst signal is supplied to the APC circuit 337. A phase difference between the reference signal and the burst signal is detected by the APC circuit 337 and a phase difference thus detected is supplied to the color difference converting decoder 333 as error data. The color difference decoder 333 carries out the phase correction on the basis of the error data supplied thereto from the APC circuit 337 to thereby obtain a chroma signal (color difference signal) whose phase is adjusted, i.e., whose jitter component is eliminated.

When the phase adjustment (jitter eliminating processing) within the chroma reproducing processor circuit 210 is effected, the burst signal whose crosstalk component is eliminated must be fed back to the chroma reproducing circuit 210 to thereby form a loop. If the signal whose crosstalk component is eliminated after the interpolation processing was made is fed back to the APC circuit 337 of the chroma reproducing processor circuit 210, then the chroma component that was interpolated and a chroma component that is not yet interpolated are changed in signal state. There is then the risk such that the APC circuit 37 will malfunction. According to the circuit arrangement of this embodiment, the bust component of the color difference signals to be utilized by the color difference converting decoder 333 within the chroma reproducing processor circuit 210 to adjust the phase is eliminated in crosstalk component by the simple line comb filter 335 within the chroma reproducing processor circuit 210, thereby protecting the detected burst component from being affected by the crosstalk component. Therefore, the automatic phase control circuit (APC) circuit 337 can detect a phase error without malfunction and the phase can be adjusted correctly.

Since it is enough that only the burst component can be correctly detected in the loop composed of the circuits including the APC circuit 337, a comb filter that eliminates the crosstalk component perfectly from a characteristic standpoint is not required, and a simple comb filter can be sufficiently utilized in actual practice. Therefore, as the comb filter 335 for the APC circuit 337, there can be used such comb filter that is relatively inexpensive, thereby suppressing the cost from being increased when two sets of crosstalk eliminating filters are utilized.

While the crosstalk component of the chroma signal (color difference signals) is eliminated by the comb filter as described above, the present invention is not limited thereto and the crosstalk component may be eliminated by a crosstalk eliminating circuit of other arrangement. While the sub-sampling is carried out at the offset of 90° between the fields as described above, the present invention is not limited thereto and the sub-sampling may be carried out in other offset conditions. Furthermore, while the chroma signal is converted into the color difference signals and then processed as described above, the present invention is not limited thereto and the chroma signal may be processed in the form of chroma signal. If the chroma signal is converted into the color difference signals and then processed, then a circuit arrangement of the processing circuit can be simplified.

According to the second embodiment of the present invention, since the offset sub-sampling process is carried out to record the chroma signal and then the chroma signal is restored by the interpolation processing upon playback, a chroma signal of band several time as wide can be reproduced by utilizing the same recording band as that of the prior art.

In this case, since the crosstalk is eliminated after the interpolation processing, the band can be most efficiently enlarged under the condition that the Nyquist theorem is satisfied. Also, the phase of the chroma signal is adjusted by the signal whose crosstalk component is eliminated from the signal that is not yet interpolated, the phase adjustment circuit can be prevented from malfunctioning.

A third embodiment of the present invention will hereinafter be described with reference to the drawings.

Figure 1:
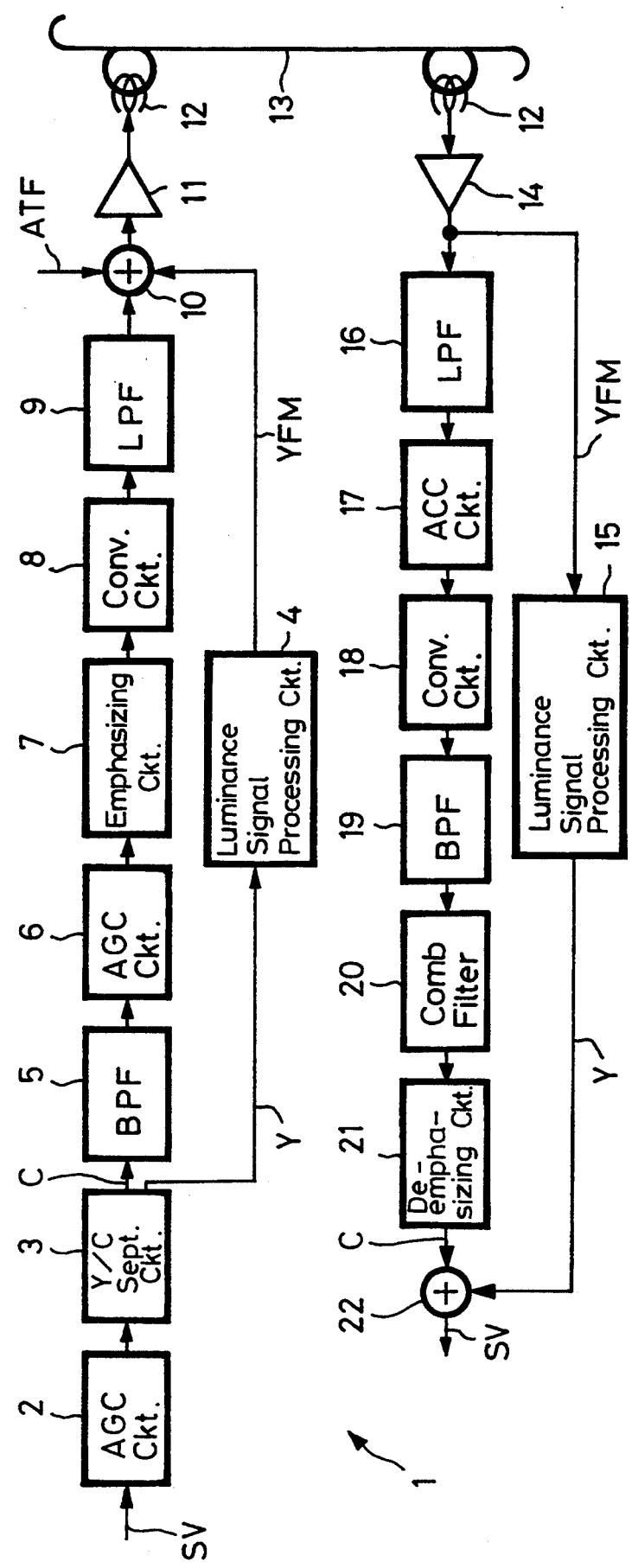
FIG. 1 is a block diagram showing a conventional video tape recorder (VTR)
Figure 9:
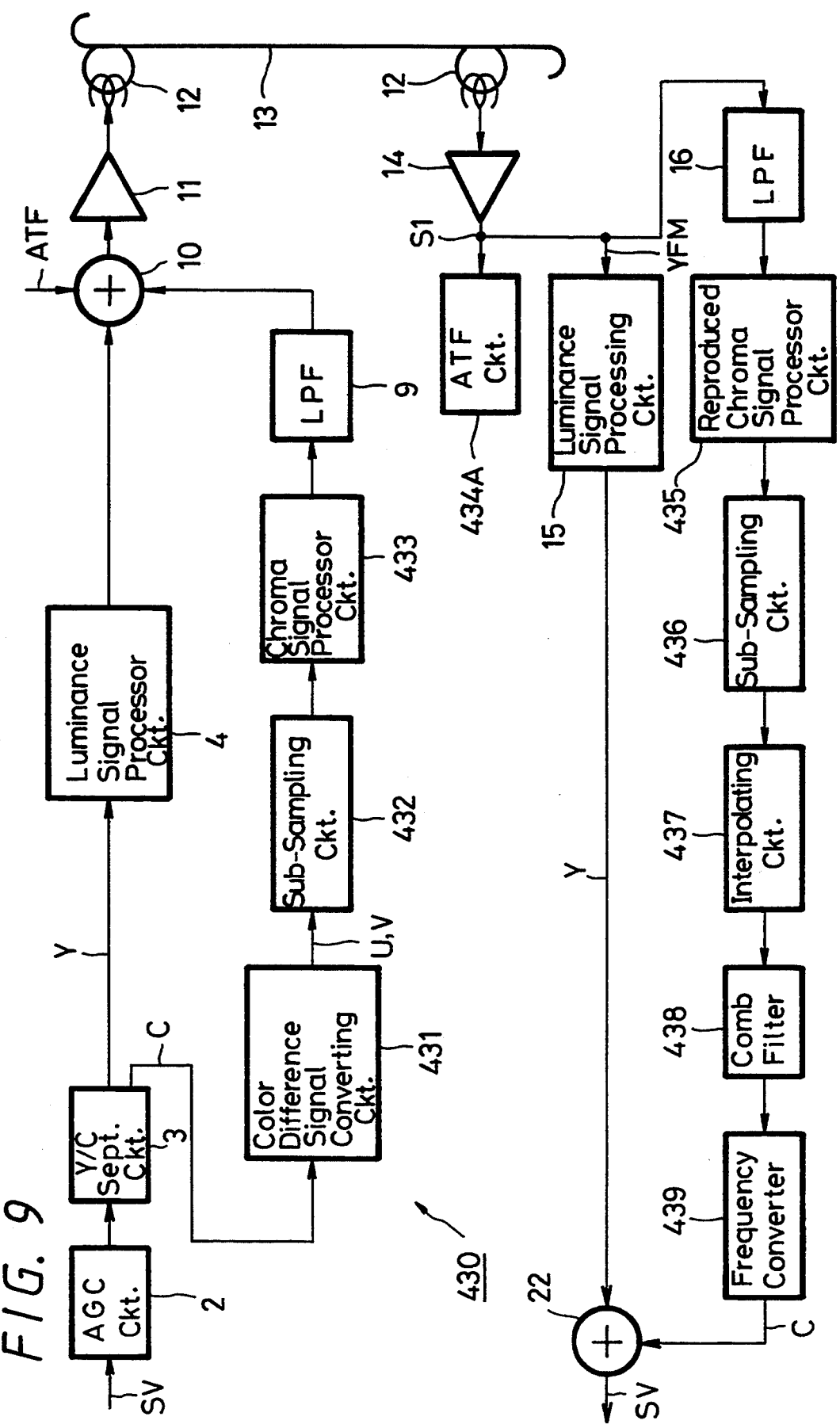
FIG. 9 is a block diagram showing a video tape recorder according to a third embodiment of the present invention.

FIG. 9 of the accompanying drawings shows in block form an overall arrangement of the third embodiment of the present invention which is applied to a video tape recorder (VTR). In FIG. 9, like parts corresponding to those of FIG. 1 are marked with the same references and therefore need not be described in detail.

In FIG. 9, reference numeral 430 generally depicts a video tape recorder in which a band of a chroma signal is extended while maintaining a compatibility with the conventional format.

To this end, in the video tape recorder 430, after the chroma signal is compressed in band, it is processed in a non-linear emphasizing processing fashion and then recorded on the magnetic tape 13.

In the video tape recorder 430, the chroma signal is converted into color difference signals U and V by a color difference signal converting circuit 431. The color difference signals U, V thus converted are supplied to a sub-sampling circuit 432, in which they are compressed in band according to the offset sub-sampling processing.

Further, in the video tape recorder 430, an output signal from the sub-sampling circuit 432 is supplied to a chroma signal processing circuit 433, in which it is converted in the form of a chroma signal and then down-converted. Thus, in the video tape recorder 430, the chroma signal is compressed in band to the frequency band specified by the conventional format and then recorded.

In the reproducing system of the video tape recorder 430, the reproduced signal S1 from the magnetic head 12 is amplified by the amplifying circuit 14 and supplied to an ATF circuit 434A which then detects a pilot signal ATF for tracking control.

Thus, in the video tape recorder 430, the tracking error signal is generated by the ATF circuit 434A and the tracking is controlled on the basis of the tracking error signal.

A reproduced chroma signal processing circuit 435 extracts a chroma signal component from the reproduced signal S1 supplied thereto through the low-pass filter circuit 16 and converts the extracted chroma signal component to color difference signals.

Color difference signals from the reproduced chroma signal processing circuit 435 are sub-sampled by a sub-sampling circuit 436 and the output signal from the sub-sampling circuit 435 is interpolated by utilizing a color difference signal of a preceding line or succeeding line by an interpolating circuit 437, whereby an image information, in which horizontal lines were thrown away and proper lines were selected by the sub-sampling circuit 432, is interpolated.

A comb filter 438 corrects a frequency characteristic of an output signal from the interpolating circuit 437 and suppresses a noise component of the above output signal by using a field memory.

Therefore, in the video tape recorder 430, the output signal of the comb filter circuit 438 is converted in the form of the chroma signal by a frequency converting circuit 439, thereby reproducing the chroma signal that was band-compressed and then recorded.

When the chroma signal is compressed in band and recorded, it is considered that, if the chroma signal is processed in a non-linear emphasizing processing fashion and recorded, then the deterioration of picture quality can be reduced more.

Figure 10:
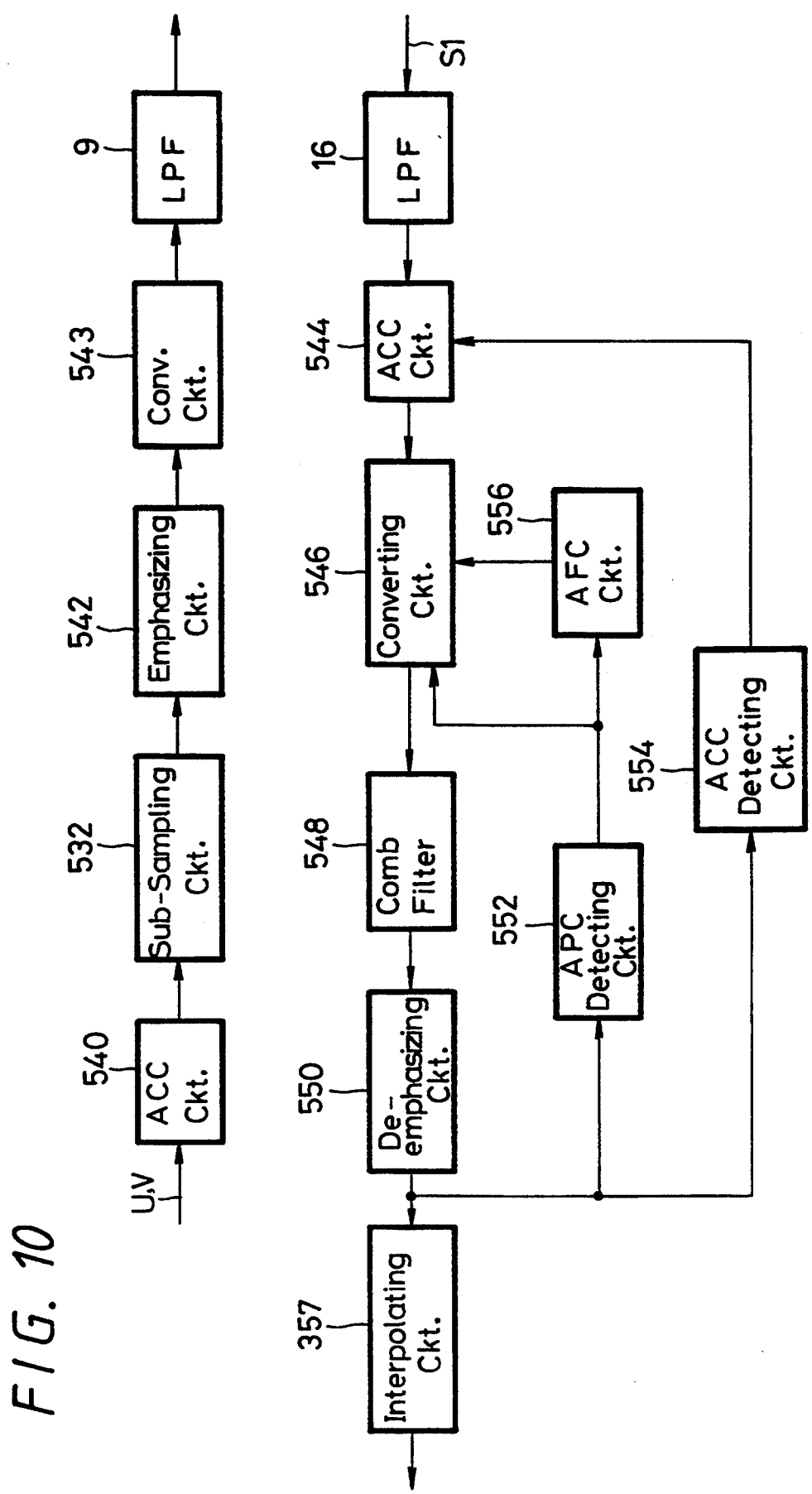
FIG. 10 is a block diagram showing an example of a specific arrangement of a recording and reproducing system of the video tape recorder shown in FIG. 9.

There is proposed a method in which a chroma signal is sub-sampled and then processed in a non-linear emphasizing fashion as shown in FIG. 10 of the accompanying drawings. FIG. 10 shows in block form an arrangement of a recording and reproducing system of the video tape recorder. As shown in FIG. 10, in the recording system, the signal levels of the color difference signals U, V are corrected by an ACC circuit 540 and supplied through a sub-sampling circuit 532 to a non-linear emphasizing processing circuit 542, in which they are processed in a non-linear emphasizing fashion.

Further, in the recording system, the output signal of the non-linear emphasizing processing circuit 542 is supplied to a converting circuit 544, in which it is converted into a chroma signal, which is then down-converted.

In the reproducing system, the reproduced signal S1 is sequentially supplied through the low-pass filter circuit 16 and an ACC circuit 544 to a converting circuit 546, in which it is converted into color difference signals. Then, these color difference signals are corrected in frequency characteristic by a comb filter circuit 548. Accordingly, the comb filter circuit 438 in FIG. 9 may be omitted.

Further, in the reproducing system, the color difference signals are processed by a de-emphasizing circuit 550 in a non-linear de-emphasizing processing fashion and then delivered through an interpolating circuit 537.

According to the above arrangement, however, it is frequently observed that a flicker occurs in a reproduced picture.

More specifically, this kind of video tape recorder 430 needs an APC loop and an ACC loop. In the circuit arrangement shown in FIG. 10, the output signal of the de-emphasizing circuit 550 is supplied to an APC detecting circuit 552 and an ACC detecting circuit 554 which then detect signal levels for the APC control and the ACC control, respectively.

A detected result from the APC detecting circuit 552 is supplied to an AFC circuit 556 which controls a phase of a reference signal that is used to convert a chroma signal. A detected result from the ACC detecting circuit 554 is supplied to the ACC circuit 544 which corrects the signal level of the reproduced signal S1.

It is, however, frequently observed that, even when the chroma signal that was processed in a non-linear emphasizing processing fashion, is processed in a non-linear de-emphasizing processing fashion, the chroma signal cannot restore its original frequency characteristic and amplitude characteristic completely. In that case, if the chroma signal is interpolated next, then it is erroneously interpolated so that a flicker or the like occurs.

Figure 11:
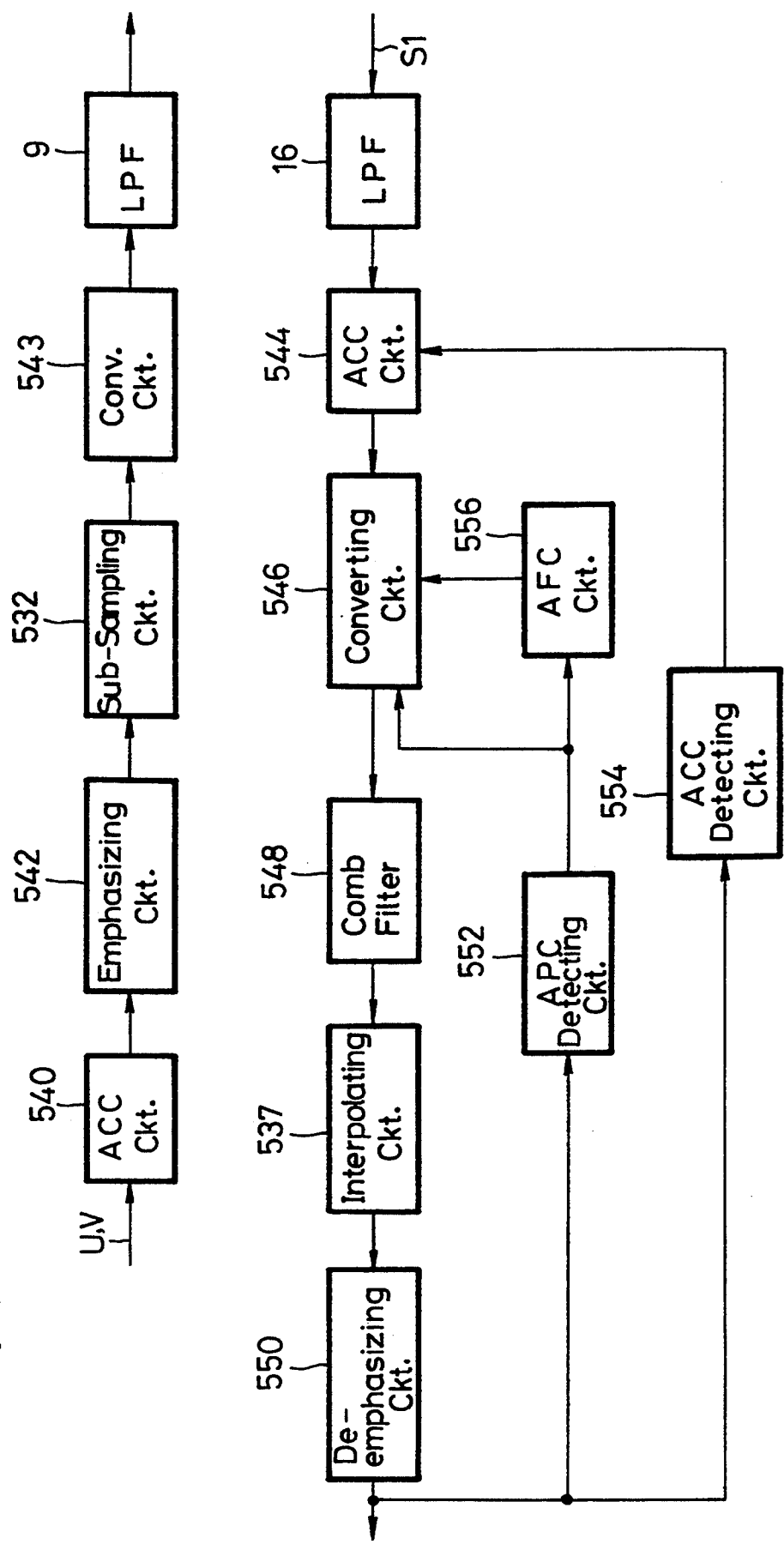
FIG. 11 is a block diagram showing a modified example of the recording and reproducing system shown in FIG. 10.

As a method of solving the above problem, there is proposed a method in which the sub-sampling processing is effected after the non-linear emphasizing processing was carried out as shown in FIG. 11 of the accompanying drawings. In FIG. 11, like parts corresponding to those of FIG. 10 are marked with the same references and therefore need not be described in detail.

In the reproducing system, as shown in FIG. 11, the interpolating circuit 537 and the de-emphasizing processing circuit 550 are changed in connection in response to the recording system.

According to the circuit arrangement shown in FIG. 11, the interpolation processing needs plenty of time while the flicker or the like can be prevented from occurring, which as a result hinders the chroma signal from being reproduced correctly.

Figure 12:
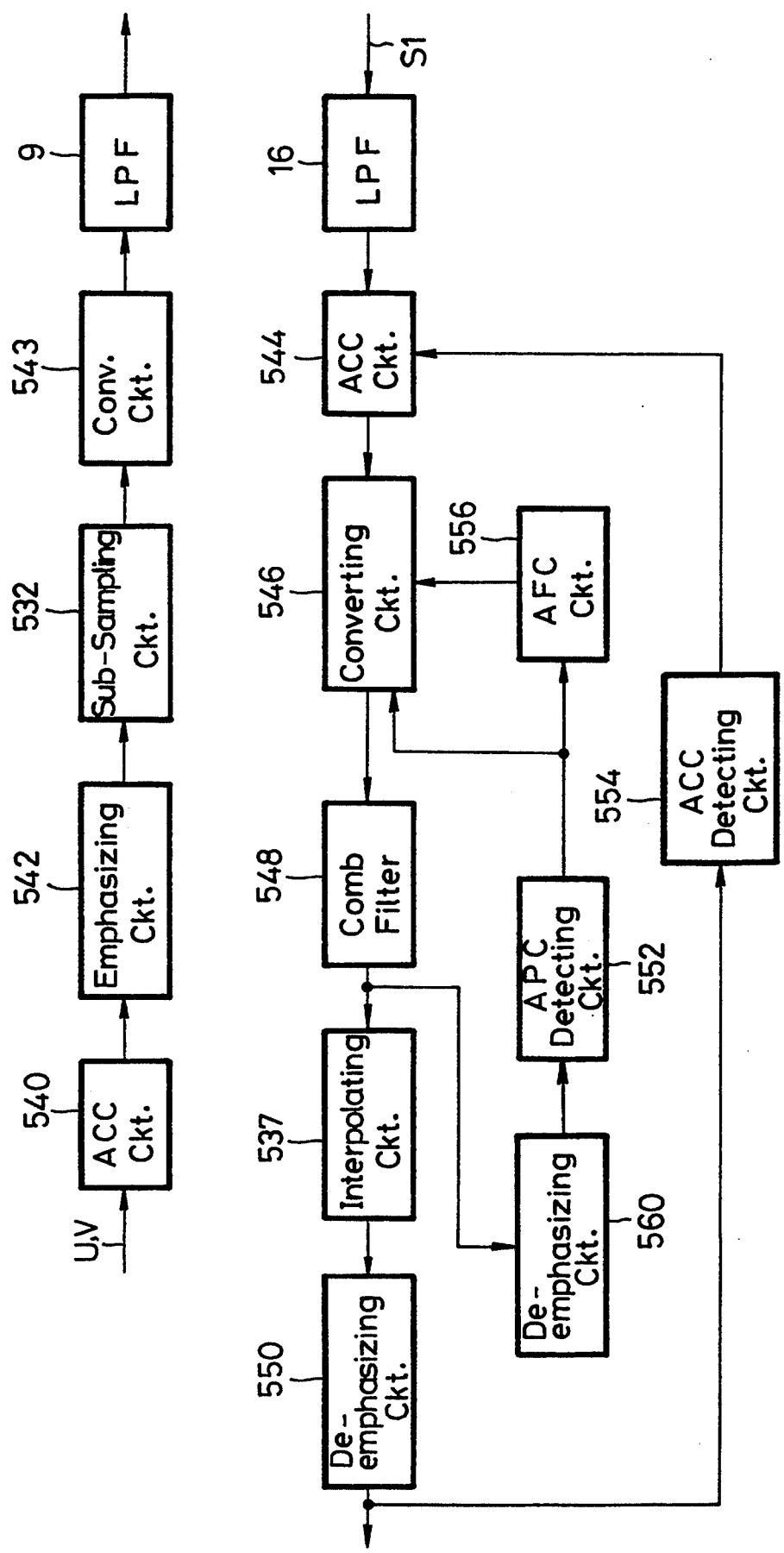
FIG. 12 is a block diagram showing an example of a specific arrangement of a recording and reproducing system according to the third embodiment of the present invention.

To overcome the above shortcoming, a recording and reproducing system is modified as shown in FIG. 12 of the accompanying drawings. As shown in FIG, 12, according to this embodiment, there is provided another de-emphasizing processing circuit 560. The output signal of the comb filter circuit 548 is supplied through the de-emphasizing processing circuit 560 to the APC detecting circuit 552.

Figure 13:
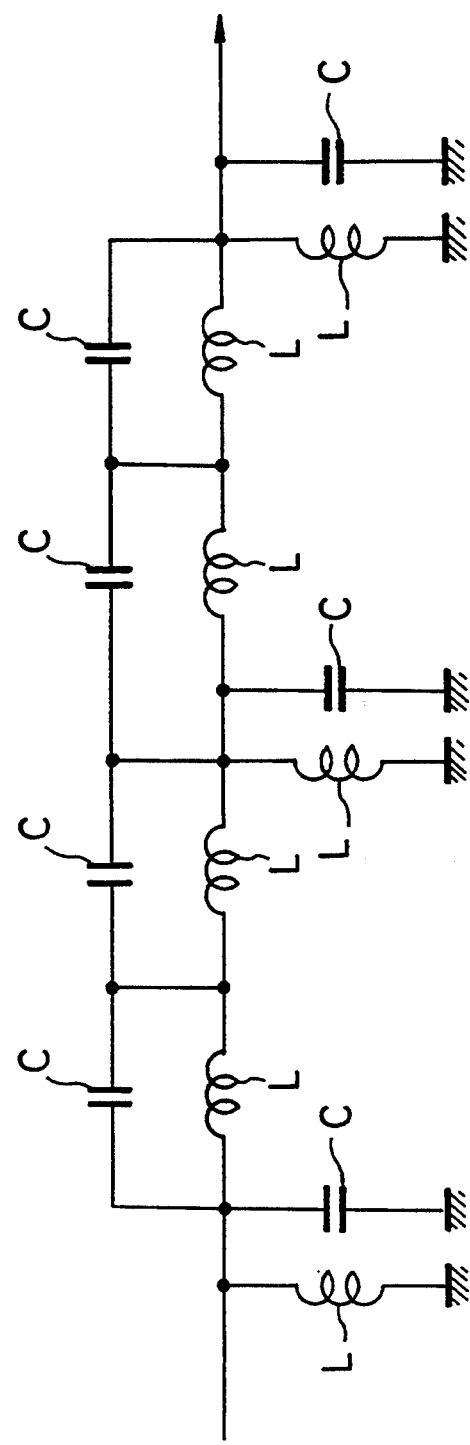
FIG. 13 is a schematic diagram showing a de-emphasizing processing circuit used in the recording and reproducing system shown in FIG. 12.

FIG. 13 of the accompanying drawings shows the de-emphasizing processing circuit 560 more in detail. As shown in FIG. 13, the de-emphasizing processing circuit 560 is a bandpass filter circuit that is formed by a combination of capacitors C and coils L to thereby suppress a side band wave of the burst signal.

The APC detecting circuit 552 waveform-shapes the burst signal contained in the color difference signals and forms the APC loop with reference to the burst signal thus waveform-shaped. Then, the input signal to the interpolating circuit 537 is input to the de-emphasizing processing circuit 560.

Thus, in the video tape recorder 430, the APC loop can be formed while a time necessary for the interpolation processing is reduced and the phase of the reproduced chroma signal can be corrected reliably by the APC loop.

According to the above arrangement, when the chroma signal that was processed in a non-linear emphasizing processing fashion, compressed in band, down-converted and then recorded, is reproduced, the chroma signal is converted into the color difference signals and then processed in a de-emphasizing processing fashion so as to suppress the side band of the burst signal independently to thereby form the APC loop, whereby the phase of the reproduced chroma signal can be corrected reliably by the simple arrangement.

Therefore, the chroma signal can be expanded in band, processed in a non-linear de-emphasizing fashion and then output, thereby making it possible to improve the picture quality of the reproduced picture more as compared with the prior art.

While the bandpass filter circuit is formed by the combination of the capacitors C and the coils L and the side band of the burst signal is suppressed by the bandpass filter circuit as described above, the present invention is not limited thereto and the following variant is also possible.

Figure 14:
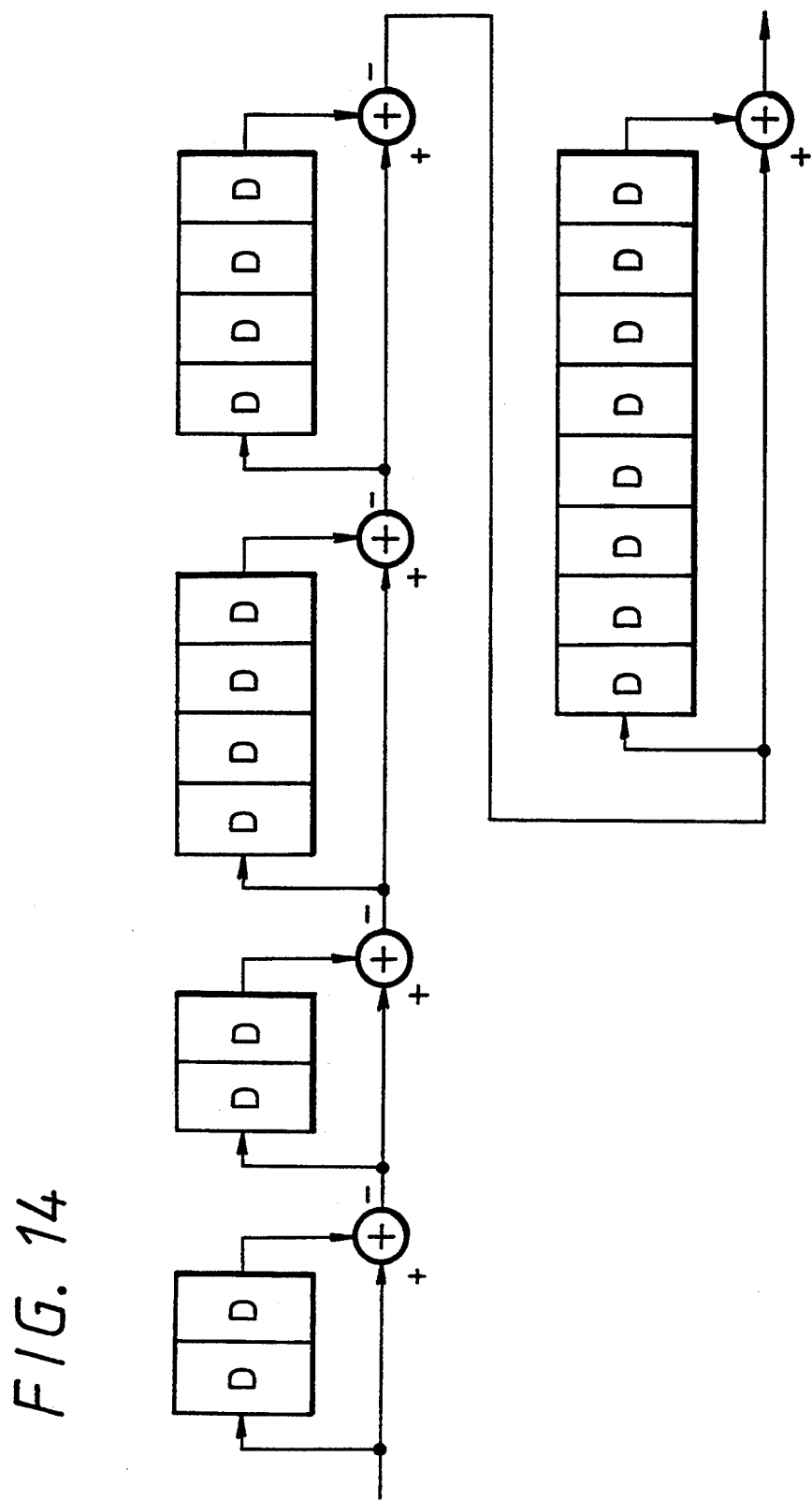
FIG. 14 is a schematic diagram showing a de-emphasizing processing circuit according to a fourth embodiment of the present invention.

That is, when a reproduced signal is converted int a digital signal and then processed, a bandpass filter circuit may be formed by a combination of delay circuits D and subtracting circuits as shown in FIG. 14 of the accompanying drawings.

While the side band of the burst signal is suppressed by using the bandpass filter circuit as described above, the present invention is not limited thereto and the side band of the burst signal may be suppressed by limiting an amplitude to a constant value by using a limiter circuit.

While the chroma signal is converted into the color difference signals and then processed as described above, the present invention is not limited thereto and the chroma signal may be processed directly.

Furthermore, while the present invention is applied to the video tape recorder and the video signal is recorded on and reproduced from the magnetic tape as described above, the present invention is not limited thereto and may be applied to a wide variety of magnetic recording and reproducing apparatus that can record and reproduce a video signal on and from a variety of magnetic recording media.

Having described preferred embodiments of the invention with reference to the accompanying drawings, it is to be understood that the present invention is not limited thereto and that various changes and modifications could be effected therein by one skilled in the art without departing from the spirit or scope of the invention as defined in the appended claims.

What is claimed is:

1. A reproducing apparatus, comprising:
    head means for reproducing a recorded signal having a chroma signal component and a burst signal component from a recording medium, said chroma signal component representing fields having pixels sampled with a sampling offset differing in four consecutive fields;
    phase correction means for correcting a phase of the reproduced signal as a function of a side band suppressed burst signal;
    first de-emphasizing means for suppressing a side band of the burst signal component in the phase corrected reproduced signal to produce said side band suppressed burst signal;
    interpolating means for interpolating adjacent pixels from four consecutive fields of the chroma signal component of the phase corrected reproduced signal to produce an interpolated chroma signal having an expanded bandwidth; and
    second de-emphasizing means for non-linearly de-emphasizing said interpolated chroma signal to produce a demodulated chroma signal.

2. The reproducing apparatus according to claim 1, wherein said first de-emphasizing means is a bandpass filter circuit.

3. The reproducing apparatus according to claim 2, wherein said bandpass filter circuit is formed by a combination of capacitors and coils.

4. The reproducing apparatus according to claim 2, wherein said bandpass filter circuit is formed by a combination of delay circuits and subtracters.

* * * * *